UNITED STATES PATENT OFFICE.

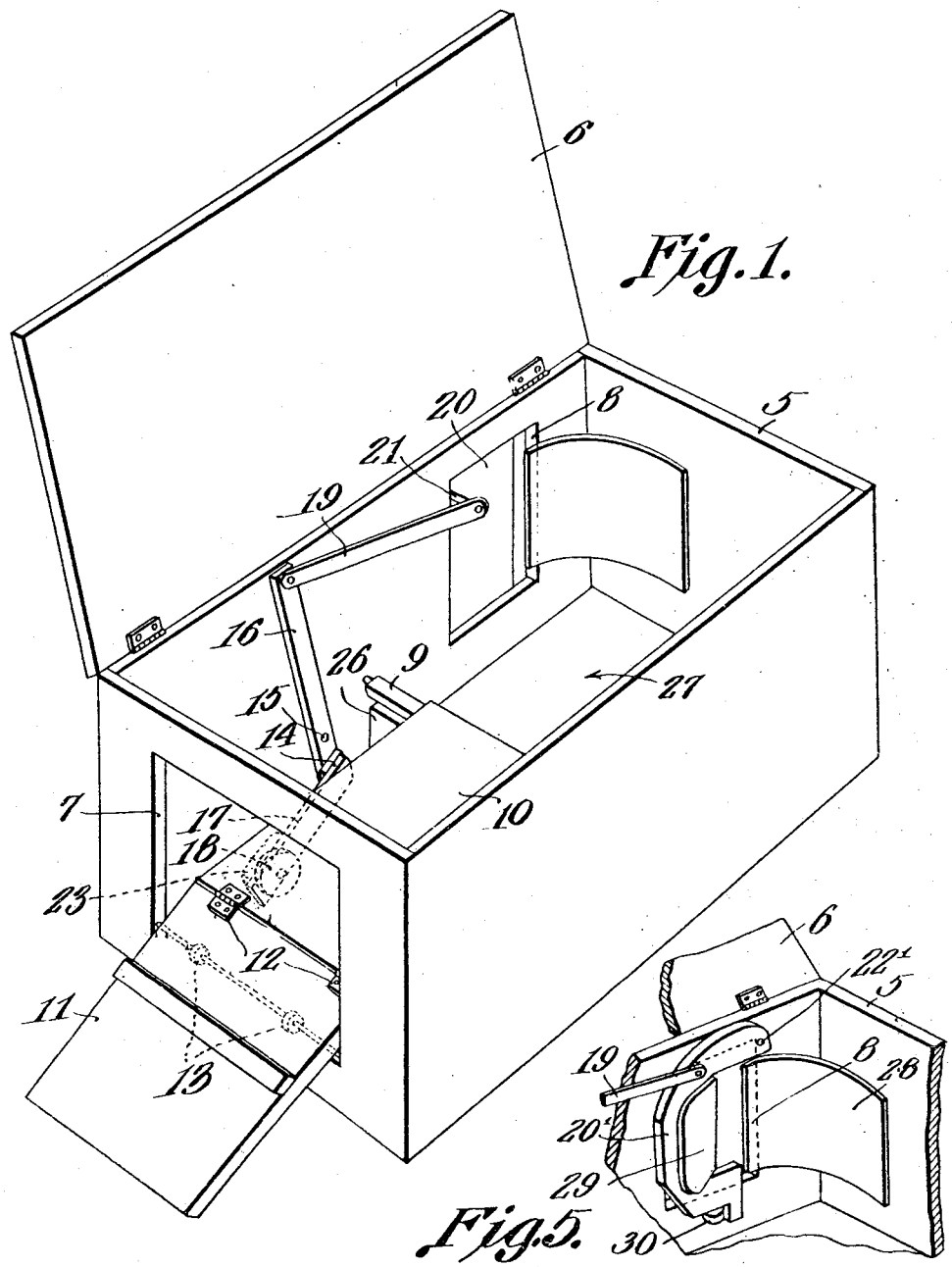

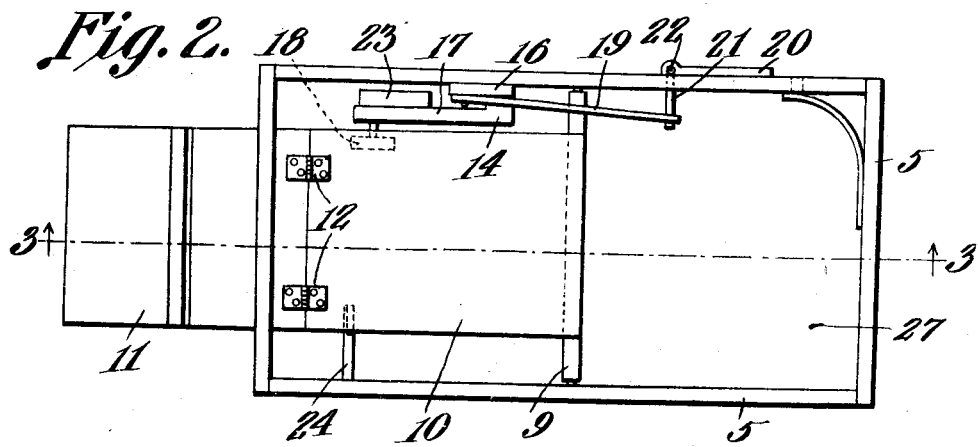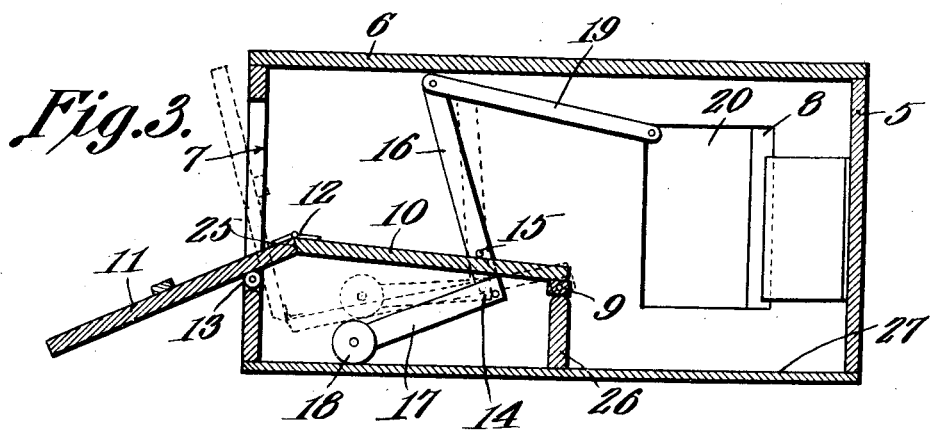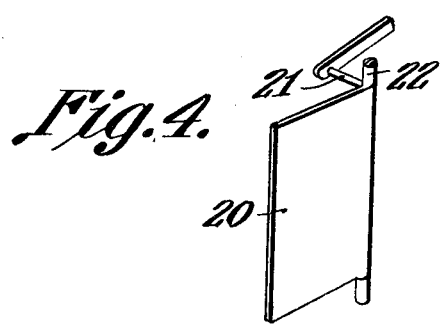

WARD J. HOLLY, OF PEWAMO, MICHIGAN.

TRAP-NEST.

1,067,340.

Specification of Letters Patent.

Patented July 15, 1913.

Application filed June 1, 1912. Serial No. 701,076.

*To all whom it may concern:*

Be it known that I, WARD J. HOLLY, a citizen of the United States, residing at Pewamo, in the county of Ionia and State of Michigan, have invented a new and useful Trap-Nest, of which the following is a specification.

This invention relates to trap nests for hens, and contemplates a device of this character into which a hen may enter in order that the hen may remain therein in quietude and seclusion, and out of which the hen may pass in order to vacate the same.

This invention also aims to provide a device of the character indicated embodying a casing having entrance and exit openings and whereby the hen may pass into the casing through the entrance, in which event, the entrance will be closed, the exit being normally closed, and means being provided for opening the entrance when the hen vacates the nest through the exit.

Another object of the present invention is to provide a trap nest wherein the hen is compelled to occupy the nest through one opening and is compelled to vacate the nest through another opening, so that the device may be employed for segregating the working hens from the drones by having the two openings communicating with adjacent or adjoining yards or inclosures.

A further object of the present invention is to provide a device of the character indicated so that a hen may occupy the nest through the entrance and vacate the nest through the exit to the exclusion of other hens while occupying the nest, and wherein the nest cannot be occupied through the exit or vacated through the entrance.

The present invention also aims to produce a device of this character which shall be simple, substantial, durable and inexpensive in construction, as well as convenient and efficient in use.

With the foregoing ends in view, this invention resides in the novel construction and combination of parts hereinafter described and particularly pointed out in the appended claims, it being understood that this device is susceptible of alterations or deviations in its details within the scope of the appended claims without departing from the spirit of the invention.

The invention has been illustrated in its preferred embodiment in the accompanying drawings, wherein similar reference characters have been employed to denote corresponding parts, and wherein—

Figure 1 is a perspective view of the trap nest with the top of the casing open and the various parts being in position for the hen to occupy the nest. Fig. 2 is a plan view of the nest with the top removed. Fig. 3 is a sectional view taken on the line 3—3 of Fig. 2. Fig. 4 is a fragmental perspective of a detail. Fig. 5 is a fragmental perspective of another nest embodying a modified form of exit door.

Referring in detail to the drawings, the casing has been designated by the numeral 5, said casing being box-like in form and having its top 6 preferably hinged thereto so as to permit the top to swing open, and this casing being constructed of wood, fiber or any other suitable material. This casing 5 has an entrance opening 7 in one end thereof, and has an exit opening 8 in one side thereof adjacent its other or rear end, the respective openings being provided with the doors 11 and 20. The entrance door 11 is hinged to the front end of the platform 10 by means of the hinges 12 and is slidable on the lower end of the entrance opening 6, the platform 10 having its inner or rear end pivoted within the casing with its free end arranged adjacent the entrance opening and the door 11 being hinged to the free end thereof. The adjacent ends of the platform and door are beveled as designated by the numeral 25 in order to limit the downward movement of the door 11 relative to the platform. Rollers 13 are mounted at the lower end of the entrance opening 7 over which the door 11 passes and afford suitable anti-frictional means for the said door. The platform 10 is pivoted within the casing 5 by means of a cross bar 9 secured to the inner or rear end thereof and having its ends trunnioned or pivoted to the sides of the casing. A stop or seat 24 is arranged within the casing below the platform 10 in order to permit the downward movement of the platform when the same is depressed. The exit door 20 is hinged to one side of the exit opening 8 by means of an upright shaft or pintle 22 at one side of the exit opening and to which the door is connected. An arm 21 projects inwardly from the upper end of the shaft or pintle 22 through the exit opening 8. A bell crank lever 14 is fulcrumed as at 15, to the side of the casing having the exit opening 8, and one arm thereof, designated 17, carries a roller or wheel 18 which extends in under the platform 10, the other arm 16 of the lever projecting upwardly, and being connected to the arm 21 of the exit door 20 by means of a pitman or connecting rod 19. The arm 17 of the bell crank lever also preferably carries a suitable weight 23 which will tend to swing the arm 17 downwardly and thereby normally close the exit door. A partition 26 is arranged between the sides of the casing below the cross bar 9 and the nest proper, designated by the numeral 27, is located between the partition 26 and the rear end of the casing, the said partition 26 serving to close the passage from the nest-proper to the space in under the platform 10.

In practice, when the nest is unoccupied, the entrance door 11 is lowered so that the free end thereof is positioned in front of the casing, the said door forming an inclined platform leading through the entrance opening 7. When the door 11 is lowered or swung downward, the free end of the platform 10 will be swung upward, the bevels of the platform and door abutting against each other to prevent the hinged ends of the said parts from swinging upwardly excessively. The exit door 20 is normally closed by the weighted arm 17 of the bell crank lever, thereby preventing the nest from being occupied through the exit opening, the said door swinging outwardly to open the exit opening. The nest may thus be occupied by a hen, the hen walking upward through the entrance opening 7 upon the door 11, and when the hen steps upon the platform 10, the weight of the hen will cause the free end of the platform to be depressed which will swing the inner end of the door 11 downward and will cause the free end of the door 11 to be swung upward thereby closing the entrance opening 7. The platform 10 in being swung downwardly so as to swing the free end of the door 11 upwardly to close the entrance opening 11, locks the door 11 from being opened, unless the same is drawn upwardly, and as a fowl outside of the nest cannot raise the door 11, the hen which has entered the nest may occupy same to the exclusion of other hens and fowls, and the hen occupying the nest can not vacate the nest through the entrance opening. The hen may then pass from the platform 10 into the nest proper 27 and after the egg has been laid, may vacate the nest by passing through the exit opening and thereby opening the door 20, it being preferable to provide a small opening between the free end of the door 20 and the corresponding side of the entrance opening 8 or to normally permit the door 20 to be slightly opened so as to lead the hen to pass through the exit opening without difficulty. When the door 20 is opened by the hen vacating the nest, the arm 21 in being swung will cause the bell crank lever to be swung therewith, thereby raising the roller 18 which in striking the platform 10 will elevate or raise same to cause the door 11 to drop or gravitate to normal position. This action will cause the entrance door to be opened when the exit door is opened, and after the hen has vacated the nest through the exit opening, the exit door 20 will be again closed by the weighted arm 17, thus permitting the nest to be again occupied by the entrance opening. Thus it will appear that the nest may be readily occupied through the entrance opening so as to permit the hen to remain therein in seclusion and quietude and without being injured or disturbed by fowls or other animals on the outside.

By having the entrance and exit openings communicating with the adjoining or adjacent yards or inclosures, this device may be used for segregating the working hens from the drones, for the reason that the hens in entering the nest from one yard or inclosure are compelled to vacate the nest into the other yard or inclosure, thereby collecting the workers in the latter yard or inclosure, or the one which communicates with the exit opening.

In using the device, it will be noted that the hens may only gain entrance into the nest through the entrance opening and can only vacate the nest through the exit opening, so that it is impossible for the hens after once vacating the nest into one yard to return into the yard or inclosure from which they came by passing through the nest. This segregation of the hens may prove useful in determining the workers or selecting the workers from a flock, so that the drones may be replaced by others.

When it is desired to leave the entrance opening open for any period of time in order to permit the hen to occupy and vacate the nest through the entrance opening, the door 11 may be held down, as seen in Fig. 1. This door 11 may be retained in its lowered position in any manner, and when the door is retained in its lowered position, the nest may be occupied and vacated through the entrance. In this manner, the attendant may keep the nest open during the day time, or whenever desired, and then by removing the obstruction which retains the door 11 in its lowered position, will cause the nest to operate in the usual fashion. It is also possible to lock the exit door 20 against being opened, so that when the nest is occupied, the hen is trapped therein and is prevented from vacating the nest, so that the hen may be retained therein for any reason or other. The objects aimed at are thereby attained in an efficient manner, and it will be apparent that this device may be constructed in various sizes and manners, and of various materials, as deemed desirable or essential, and may be altered or changed in its details within the scope of the appended claims without departing from the spirit of the invention.

In the construction shown in Fig. 5, the exit door 20' is arranged on the inner side of the casing and is pivoted as at 22' above the doorway 8 so as to swing vertically to and from the doorway or door-opening. The pitman 19 is connected directly to the door 20' adjoining the pivot 22' so that when the exit door is swung upwardly, the pitman will be drawn rearwardly to open the entrance door, which is the same as in the foregoing structure. When exit door 20' is closed, a sight or lookout opening is left between the rear edge of the door and the rear edge of the doorway 8 in order to lead the hen through the exit opening when vacating the nest. The guide 28 is secured between the rear edge of the doorway and the rear end of the casing, and a guide or deflector 29 is carried by the door and extends to the rear edge thereof, in order to coöperate with the guide 28, so that when the hen forces her way between the guides 28 and 29, the exit door 20' will be swung upwardly in order to open the doorway 8. The door 20' carries the roller 30 at its lower end which contacts with the side of the casing to provide for the easy swinging motion of the door, thereby providing suitable anti-frictional means for the door. The door 20', after the hen has vacated the nest, will again return to closed position, by gravity.

Having described the invention, what is claimed as new is:—

1. A trap hen's nest embodying a casing having entrance and exit openings, a platform pivoted at one end within the casing with its free end arranged adjacent the entrance opening, a door hinged to the free end of the platform and slidable on the lower end of the entrance opening, a door for the exit opening, a lever pivoted within the casing and connected to the exit door, and a roller carried by the lever and positioned below the platform so that when the exit door is opened the platform is elevated.

2. A trap hen's nest embodying a casing having an entrance opening at one end and an exit opening in one side, a platform pivoted at one end within the casing with its free end arranged adjacent the entrance opening, a door for the entrance opening hinged to the free end of the platform and slidable on the lower end of the entrance opening, a door for the exit opening, a bell crank lever fulcrumed to the side of the casing having the exit opening, a roller carried by one arm of the lever and positioned below the platform, and a pitman connecting the other arm of the lever and the exit door.

In testimony that I claim the foregoing as my own, I have hereto affixed my signature in the presence of two witnesses.

WARD J. HOLLY.

Witnesses:
 G. W. AMSDEN,
 JAMES T. COTTER.